United States Patent
Fahr et al.

(10) Patent No.: US 11,402,648 B2
(45) Date of Patent: Aug. 2, 2022

(54) METHOD AND DEVICE FOR COUPLING OUT A PARTIAL BEAM HAVING A VERY SMALL BEAM PERCENTAGE FROM AN OPTICAL BEAM

(71) Applicant: JENOPTIK Optical Systems GmbH, Jena (DE)

(72) Inventors: Stephan Fahr, Jena (DE); Torsten Erbe, Jena (DE); Markus Augustin, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 308 days.

(21) Appl. No.: 16/762,677

(22) PCT Filed: Nov. 8, 2018

(86) PCT No.: PCT/DE2018/100907
§ 371 (c)(1),
(2) Date: May 8, 2020

(87) PCT Pub. No.: WO2019/091516
PCT Pub. Date: May 16, 2019

(65) Prior Publication Data
US 2021/0173221 A1 Jun. 10, 2021

(30) Foreign Application Priority Data
Nov. 9, 2017 (DE) ...................... 10 2017 126 221.0

(51) Int. Cl.
*G02B 27/28* (2006.01)
*G01J 3/447* (2006.01)
(52) U.S. Cl.
CPC ............ *G02B 27/283* (2013.01); *G01J 3/447* (2013.01)

(58) Field of Classification Search
CPC .. G02B 5/3083; G02B 5/3025; G02B 27/283; G02B 27/286; G02B 5/3016;
(Continued)

(56) References Cited
U.S. PATENT DOCUMENTS

| | | | |
|---|---|---|---|
| 6,608,674 | B2 | 8/2003 | Gerlach et al. |
| 8,526,005 | B1 | 9/2013 | Mason et al. |

FOREIGN PATENT DOCUMENTS

| | | |
|---|---|---|
| DE | 100 31 414 A1 | 1/2002 |
| GB | 2 256 725 A | 12/1992 |
| GB | 2528705 A | 2/2016 |

OTHER PUBLICATIONS

Schott Optical Glass Pocket Catalogue of Feb. 2016 (http://www.schott.com/d/advanced_optics/Ide0c3b6-552e-4ecd-6297-d1c10099a0c2/1.5/schott-optical-glass-pocket-catalog-february-2016-de.pdf) (148 pages).

*Primary Examiner* — Collin X Beatty
*Assistant Examiner* — Grant A Gagnon
(74) *Attorney, Agent, or Firm* — Christensen, Fonder, Dardi & Herbert PLLC

(57) ABSTRACT

The invention relates to a device comprising a beam splitter and a method of using the device. The device comprises a beam emitting unit and a downstream beam splitter, which is formed by two adjacent planar plates of different materials. For a specified wavelength range of an optical beam from which a partial beam is to be coupled out by reflection, the material of the first planar plate has a minimum refractive index which is greater by a refractive index interval than the maximum refractive index of the material of the second planar plate. From the optical beam, which, collimated and linearly polarized parallel to a plane of incidence, impinges on the beam splitter at a certain angle of incidence, the partial beam having only a small summary percentage of the (Continued)

optical beam and a small spectral fluctuation range is coupled out.

4 Claims, 4 Drawing Sheets

(58) Field of Classification Search
CPC ...... G02B 27/28; G02B 30/25; G02B 5/3058; G02B 27/281; G02B 1/08; G02B 5/305; G02B 5/23; G02B 5/3033; G02B 5/3041; G02B 26/02; G02B 27/285; G02B 5/0841; G02B 1/02; G02B 1/04; G02B 27/145; G02B 27/288; G02B 27/0093; G02B 6/0055; G02B 6/0056; G02B 6/4246; G02B 26/001; G02B 27/149; G02B 5/1809; G02B 5/3066; G02B 5/3075; G02B 1/06; G02B 5/30; G02B 6/0046; G02B 6/005; G02B 6/0096; G02B 6/272; G02B 1/10; G02B 1/11; G02B 21/0092; G02B 27/0101; G02B 27/0927; G02B 27/1046; G02B 27/1073; G02B 27/144; G02B 27/48; G02B 5/04; G02B 5/0883; G02B 5/26; G02B 5/32; G02B 6/2746; G02B 6/2766; G02B 6/32; G02B 6/34; G02B 6/4208; G02B 6/4214; G02B 1/14; G02B 13/143; G02B 21/0068; G02B 26/105; G02B 27/1006; G02B 30/27; G02B 30/56; G02B 5/00; G02B 6/105; G02B 6/274; G02B 6/2937; G02B 6/2938; G02B 6/305; G02B 6/4206; G02B 6/43; G02B 1/115; G02B 13/24; G02B 17/0892; G02B 19/0028; G02B 2027/012; G02B 21/0016; G02B 23/00; G02B 26/10; G02B 27/0025; G02B 27/022; G02B 27/095; G02B 27/0977; G02B 27/1053; G02B 27/106; G02B 27/108; G02B 27/142; G02B 27/143; G02B 27/642; G02B 3/0056; G02B 5/008; G02B 5/0278; G02B 5/201; G02B 5/3008; G02B 6/12007; G02B 6/126; G02B 6/2713; G02B 6/2773; G02B 6/2848; G02B 6/29302; G02B 6/29311; G02B 6/29362; G02B 6/29395; G02B 6/327; G02B 7/008; G02B 7/182; G02B 1/005; G02B 1/041; G02B 1/12; G02B 13/001; G02B 13/0045; G02B 13/16; G02B 17/00; G02B 17/061; G02B 17/08; G02B 19/0019; G02B 19/0033; G02B 19/0061; G02B 2006/0098; G02B 2006/12097; G02B 2006/12107; G02B 2006/12147; G02B 2006/12152; G02B 2027/0114; G02B 2027/0118; G02B 2027/0125; G02B 2027/0132; G02B 2027/0136; G02B 2027/0178; G02B 2027/0194; G02B 21/0004; G02B 21/002; G02B 21/0032; G02B 21/0044; G02B 21/0048; G02B 21/0056; G02B 21/06; G02B 21/125; G02B 21/14; G02B 2207/117; G02B 23/12; G02B 26/00; G02B 26/008; G02B 26/0825; G02B 26/0833; G02B 26/101; G02B 26/12; G02B 26/123; G02B 26/124; G02B 27/0018; G02B 27/0081; G02B 27/0172; G02B 27/02; G02B 27/026; G02B 27/09; G02B 27/0944; G02B 27/0961; G02B 27/0988; G02B 27/0994; G02B 27/1026; G02B 27/1033; G02B 27/1093; G02B 27/123; G02B 27/141; G02B 27/148; G02B 27/18; G02B 27/42; G02B 27/4233; G02B 27/46; G02B 27/60; G02B 3/0012; G02B 3/0043; G02B 3/0062; G02B 3/0087; G02B 3/08; G02B 3/10; G02B 30/26; G02B 30/30; G02B 30/34; G02B 5/003; G02B 5/02; G02B 5/0215; G02B 5/0236; G02B 5/0252; G02B 5/0257; G02B 5/0263; G02B 5/0294; G02B 5/08; G02B 5/124; G02B 5/18; G02B 5/1814; G02B 5/1819; G02B 5/1857; G02B 5/1866; G02B 5/20; G02B 5/28; G02B 5/284; G02B 5/285; G02B 5/287; G02B 5/288; G02B 5/3091; G02B 6/00; G02B 6/0008; G02B 6/0018; G02B 6/0028; G02B 6/003; G02B 6/0038; G02B 6/0051; G02B 6/0053; G02B 6/12011; G02B 6/12014; G02B 6/12023; G02B 6/122; G02B 6/124; G02B 6/14; G02B 6/264; G02B 6/266; G02B 6/2726; G02B 6/276; G02B 6/278; G02B 6/2786; G02B 6/2813; G02B 6/29317; G02B 6/2934; G02B 6/29358; G02B 6/29361; G02B 6/29386; G02B 6/29392; G02B 6/3552; G02B 6/356; G02B 6/3592; G02B 6/3594; G02B 6/3833; G02B 6/42; G02B 6/4204; G02B 9/34; G02B 27/00; G01J 4/04; G01J 4/00; G01J 3/447; G01J 1/04; G01J 1/0414; G01J 1/0418; G01J 2003/1269; G01J 3/12; G01J 3/28; G01J 3/2823; G01J 3/42; G01J 3/00
See application file for complete search history.

METHOD AND DEVICE FOR COUPLING OUT A PARTIAL BEAM HAVING A VERY SMALL BEAM PERCENTAGE FROM AN OPTICAL BEAM

PRIORITY CLAIM

The present application is a National Phase entry of PCT Application No. PCT/DE2018/100907, filed Nov. 8, 2018, which claims priority from German Patent Application 10 2017 126 221.0, filed Nov. 9, 2017, the disclosures of which are hereby incorporated by reference herein in their entirety.

FIELD OF THE INVENTION

Method and device for coupling out a partial beam having a very small beam percentage from an optical beam

BACKGROUND OF THE INVENTION

Typically, semi-transparent mirrors are used to couple out a beam portion from an optical beam, said mirrors having an at least approximately constant reflectivity over a specific spectral range and thus having no more than a small spectral fluctuation range. If only a small beam portion is to be coupled out by reflection, e.g. less than 1%, then the semi-transparent coating of the mirror should reflect only such a small portion. However, the reflectivity of such coatings varies considerably over the desired wavelength range, e.g. between 0.1 and 0.4%, which corresponds to a change in the coupled-out beam portion by a factor of 4 over the wavelength range. An optical beam may comprise a wavelength range which extends beyond visible light into the infrared range and into the UV range up to wavelengths of around 150 nm.

DE 100 31 414 A1 discloses a device for combining optical radiation by exploiting the polarization properties of light. Said device comprises a plane-parallel, optically transparent plate having a refractive index n and comprising an optically active first surface on which a first optical beam (active beam) impinges and an optically active second surface, parallel to the first surface, on which a second optical beam (targeting beam) impinges at the point where the first beam emerges from this second surface. The beam paths of the first and second optical beams are directed onto the plate in such a way that the first and second beams are each incident at an angle to the respective surface perpendicular which is at least approximately equal to the Brewster angle. The first and second optical beams are linearly polarized, the plane of polarization of the first beam being parallel to the plane of incidence of the device and that of the second optical beam being perpendicular to the plane of incidence.

The device according to the above-mentioned DE 100 31 414 A1 is a device for combining the two optical beams, but at least for the first of the two optical beams it is also a beam splitting device. The physical effect is exploited here that when an optical beam (p-polarized beam) linearly polarized parallel to the plane of incidence (interface) impinges on an interface at the Brewster angle, the optical beam is completely refracted at the interface, assuming that this radiation comprises only one wavelength. Since the optical beam has radiation over an extended wavelength spectrum and the refractive indices of the media adjacent to the interface are wavelength-dependent, the Brewster angle is also wavelength-dependent. This means that only the spectral component of the beam is completely refracted at the interface for which the angle of incidence ideally corresponds to the Brewster angle. Spectral components of adjacent spectral ranges are reflected slightly, so that, as stated in the above-mentioned DE 100 31 414 A1, the beam portion entering the planar plate at the interface is very large compared to the beam portion reflected at the interface. The reflected beam portion is fed to a photo receiver. Although not mentioned here, for physical reasons there is a high fluctuation range of the reflected beam portion over the wavelength spectrum of the optical beam.

SUMMARY OF THE INVENTION

The invention relates to a method and a device with a beam splitter which couples out a very small beam percentage over a large spectral range of an incident optical beam, wherein the spectral dependence of the coupled-out beam percentage and thus its spectral fluctuation range is only small.

It is an object of the invention to provide a method and a device with which, by utilizing the polarization properties of light, only a very small beam portion can be coupled out of an optical beam, advantageously with a small fluctuation range over the wavelength spectrum of the optical beam.

The objects of the inventive devices and methods are achieved by the features of the claims.

BRIEF DESCRIPTION OF THE DRAWINGS

The invention will be explained in more detail below with reference to exemplary embodiments and with the help of drawings, wherein.

DETAILED DESCRIPTION

Figure 1:
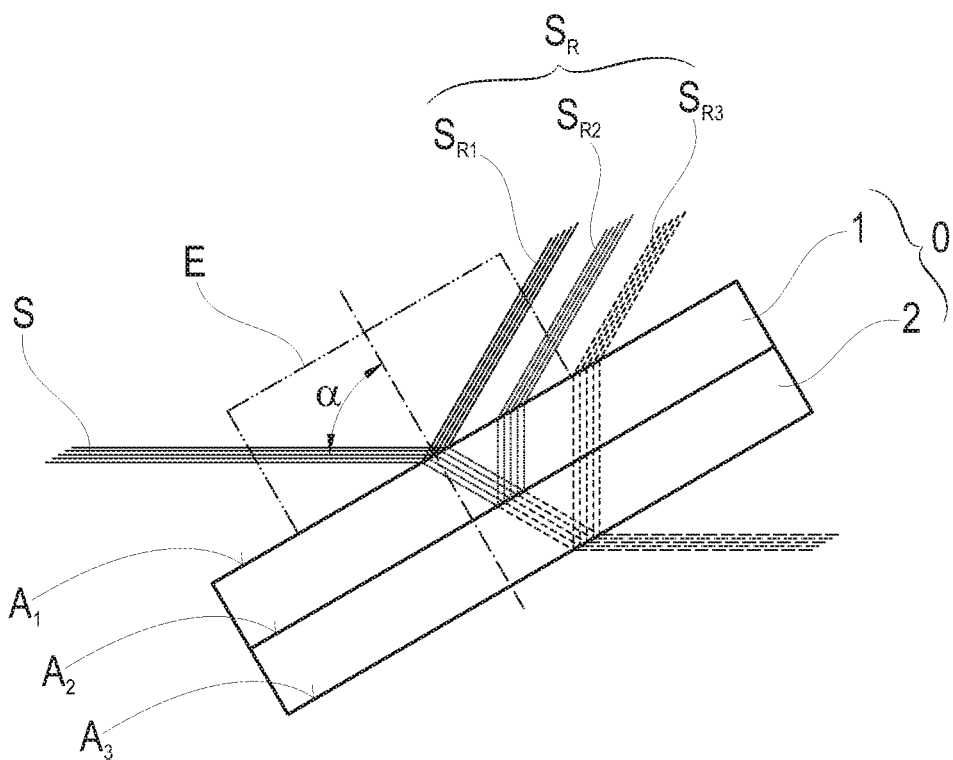
FIG. 1 is a schematic diagram showing a beam splitter of a device.

A beam splitter 0 of a device according to the invention basically consists, as shown in FIG. 1, of two interconnected planar plates 1, 2, of a different material and has three interfaces $A_1, A_2, A_3$, at which an incident optical beam S, depending on an angle of incidence α and depending on the wavelength λ, of the beam S is partly refracted and partly reflected as partial beams $S_{R1}, S_{R2}, S_{R3}$, which together form a summarily reflected partial beam $S_R$. The summarily reflected partial beam $S_R$ should have only a small summary beam percentage $R_{sum}$ of the optical beam S. Accordingly, the respective reflected beam percentage $R_1, R_2$ und $R_3$ at the individual interfaces $A_1, A_2, A_3$ is even smaller and multiple reflections can be neglected. The optical beam S is linearly polarized parallel to a plane of incidence E located in the drawing plane in this case. The plane of incidence E is defined by the direction of incidence of the optical beam S and the perpendicular to the interface in question. The angle of incidence α is defined as the angle between the direction of incidence of the optical beam S and the perpendicular to the interface in question.

Viewed in only one coupling direction, an entrance surface of the first planar plate 1 forms the first interface $A_1$, an exit surface of the first planar plate 1 together with an entrance surface of the second planar plate 2 forms the second interface $A_2$ and an exit surface of the second planar plate 2 forms the third interface $A_3$. The optical beam S is coupled into the beam splitter 0 either via the first interface $A_1$ or the third interface $A_3$.

Since the first interface $A_1$ and the third interface $A_3$ are adjacent to air, a gas or a vacuum, which are each characterized by a refractive index of at least approximately 1, the Brewster angle at the first interface $A_1$ or at the third interface $A_3$, which can be calculated from the arctangent (arctan) of the refractive index ratio of the adjacent materials, is formed from the refractive index $n_1(\lambda)$ or $n_2(\lambda)$ and 1. In the following, assuming that the refractive index of the gaseous medium is equal to 1, it will be assumed, for the sake of simplicity, that at an interface formed between a gaseous medium or vacuum and an optical body, the Brewster angle is calculated only from the arctangent of the refractive index of the material of the optical body.

It is essential to the invention that the material for the two planar plates 1, 2 is selected in such a way that the material of the first planar plate 1 has a minimum refractive index $n_{1min}$ within a predetermined wavelength range of the optical beam S which is greater by a positive refractive index interval a than the maximum refractive index $n_{2max}$ of the material of the second planar plate 2 within the predetermined wavelength range. This means that there is a gap between the maximum refractive index $n_{2max}$ of the material of the second planar plate 2 and the minimum refractive index $n_{1min}$ of the material of the first planar plate 1.

If, in a beam splitter 0 designed in this way, a collimated optical beam S, linearly polarized parallel to an entrance plane E, is coupled into the beam splitter 0 at an angle of incidence α with respect to the perpendicular to the interface $A_1$ or with respect to the perpendicular to the interface $A_3$, which angle can be calculated as the Brewster angle for a refractive index $n_a$ greater than the maximum refractive index $n_{2max}$ of the second planar plate 2, and which is smaller than the Brewster angle for the maximum refractive index $n_{1max}$ of the first planar plate 1 plus 5°, then the result is a summary beam percentage $R_{sum}$ of less than 10% of the optical beam S.

The angle of incidence α is advantageously selected such that it corresponds to a Brewster angle for a refractive index $n_a$ at which the reflectivity $R_2$ of the second interface $A_2$ in relation to the sum $R_{sum}=R_1+R_2+R_3$ has a maximum at the lower end of the specified wavelength range. For a specified wavelength range of, for example, 400 nm to 1100 nm, a summary beam percentage $R_{sum}<10\%$ with a fluctuation range <120% can be achieved. For a larger wavelength range, e.g. from 300 nm to 1100 nm, fluctuation ranges of <250% can be achieved.

Figure 3A:
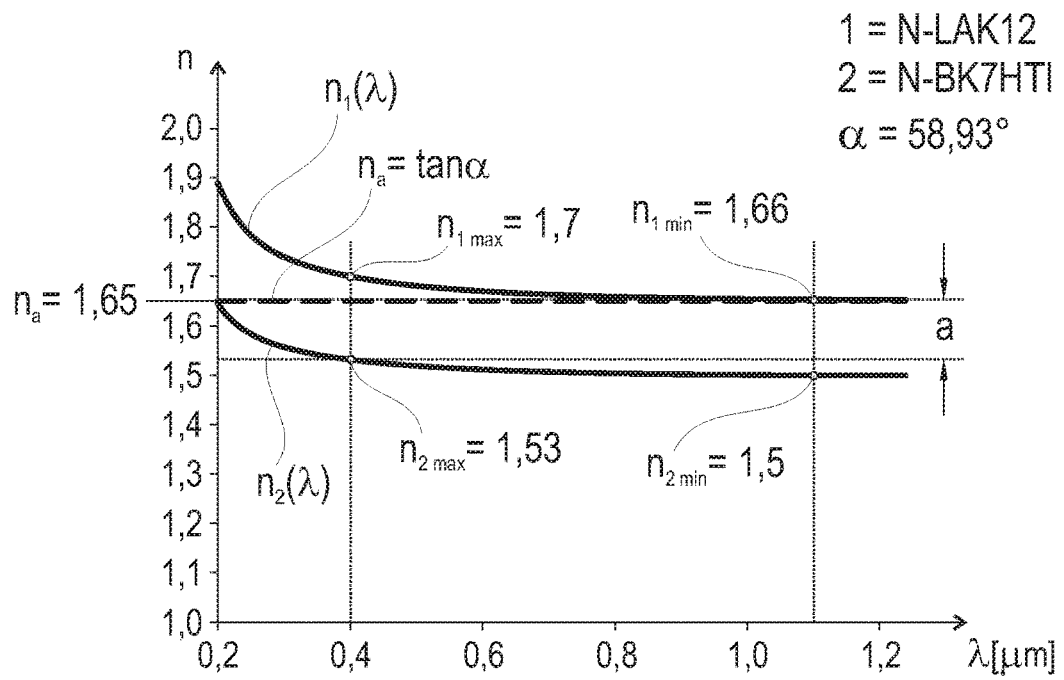
FIG. 3a is a diagram showing the refractive indices $n_1(\lambda)$ and $n_2(\lambda)$ for a first exemplary embodiment of a beam splitter of a device and the entry of a refractive index $n_a$ for which the angle of incidence $\alpha$ is the Brewster angle.
Figure 4A:
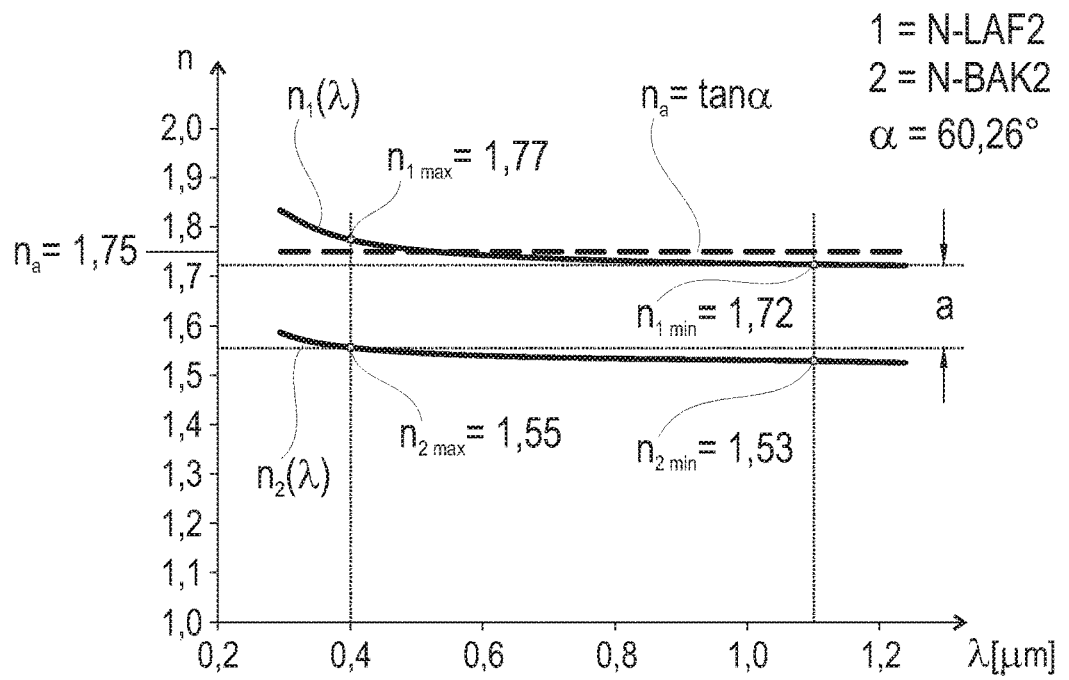
FIG. 4a is a diagram showing the refractive indices $n_1(\lambda)$ and $n_2(\lambda)$ for a second exemplary embodiment of a beam splitter of a device and the entry of a refractive index $n_a$ for which the angle of incidence $\alpha$ is the Brewster angle.
Figure 5A:
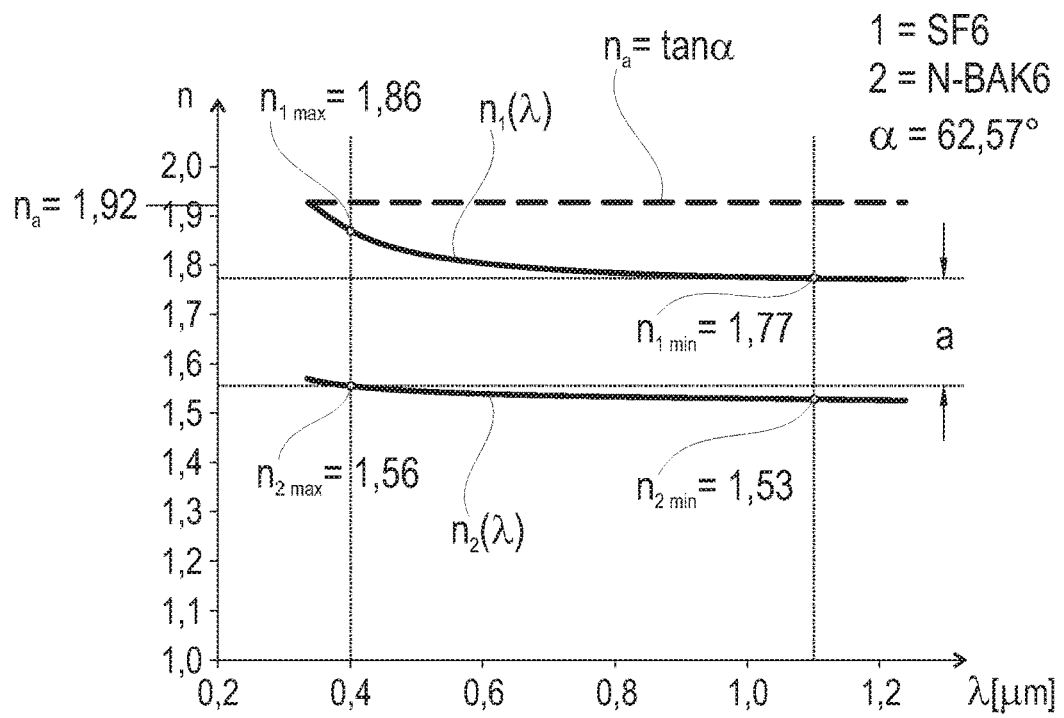
FIG. 5a is a diagram showing the refractive indices $n_1(\lambda)$ and $n_2(\lambda)$ for a third exemplary embodiment of a beam splitter of a device and the entry of a refractive index $n_a$ for which the angle of incidence $\alpha$ is the Brewster angle.

FIGS. 3a, 4a and 5a each show a respective diagram for the refractive indices $n_1(\lambda), n_2(\lambda)$ of the material of the two planar plates 1, 2 of a respective exemplary embodiment for a beam splitter 0 over the wavelength λ, and in each case a refractive index $n_a$ is entered for which a selected angle of incidence α represents the Brewster angle.

In the exemplary embodiments, it was assumed for the sake of simplicity that the optical beam S is coupled into the beam splitter 0 via the first interface $A_1$.

Figure 3B:
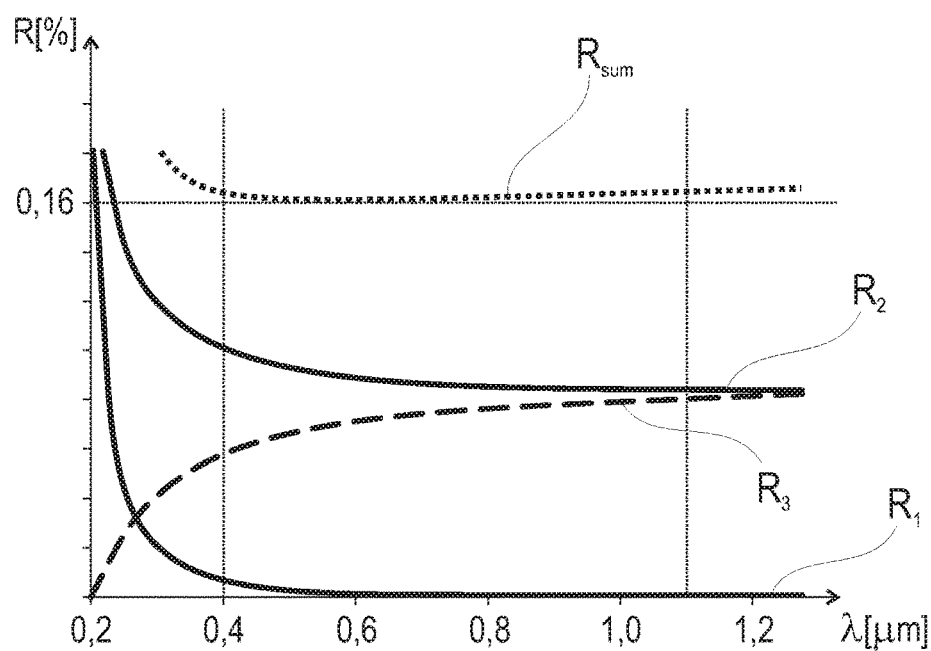
FIG. 3b is a diagram showing the reflected beam percentage $R_1$, $R_2$, $R_3$ at the individual interfaces $A_1$, $A_2$, $A_3$ of a beam splitter of a device, with the refractive indices $n1(\lambda)$ and $n_2(\lambda)$ according to FIG. 3a and the resulting summarily reflected beam percentage $R_{sum}$ for the beam splitter.

For the example shown in FIG. 3a, for which the beam percentage $R_1, R_2, R_3$ reflected at the individual interfaces $A_1, A_2, A_3$ and the summary beam percentage $R_{sum}$ are given in FIG. 3b, an angle of incidence α equal to a Brewster angle for a refractive index greater than $n_{2max}$ and smaller than $n_{1min}$ was selected. N-LAK 12 was selected as the material for the first planar plate and N-BK7HTI for the second planar plate. Within the specified spectral range between 400 nm and 1100 nm, neither material has a refractive index between 1.53 and 1.66. This refractive index range is understood as the refractive index interval a or refractive index gap. The angle of incidence α selected in this connection is 58.93° and corresponds to the Brewster angle for a refractive index $n_a$ equal to 1.65. The summary beam percentage $R_{sum}$ over the specified spectral range is 0.16% of the optical beam S, with a fluctuation range of 2.0%.

Figure 4B:
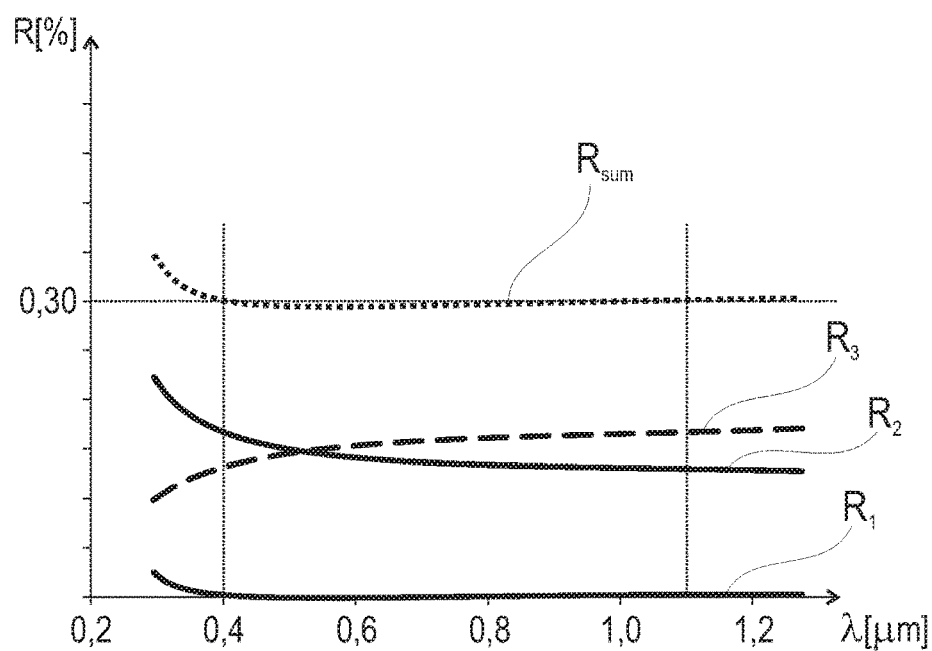
FIG. 4b is a diagram showing the reflected beam percentage $R_1$, $R_2$, $R_3$ at the individual interfaces $A_1$, $A_2$, $A_3$ of a beam splitter of a device, with the refractive indices $n_1(\lambda)$ and $n_2(\lambda)$ according to FIG. 4a and the resulting summarily reflected beam percentage $R_{sum}$ for the beam splitter.

For the example shown in FIG. 4a, for which the beam percentage $R_1, R_2, R_3$ reflected at the individual interfaces $A_1, A_2, A_3$ and the summary beam percentage $R_{sum}$ are given in FIG. 4b, an angle of incidence α equal to a Brewster angle for a refractive index greater than $n_{1min}$ and smaller than $n_{1max}$ was selected. 1 N-LAF 2 was selected as the material for the first planar plate and 2 N-BAK 2 for the second planar plate. The specified spectral range is between 400 nm and 1100 nm. The angle of incidence α selected in this connection is 60.26° and corresponds to the Brewster angle for a refractive index $n_a$ equal to 1.75. The summary beam percentage $R_{sum}$ over the specified spectral range is 0.30% of the optical beam S, with a fluctuation range of 1.9%.

Figure 5B:
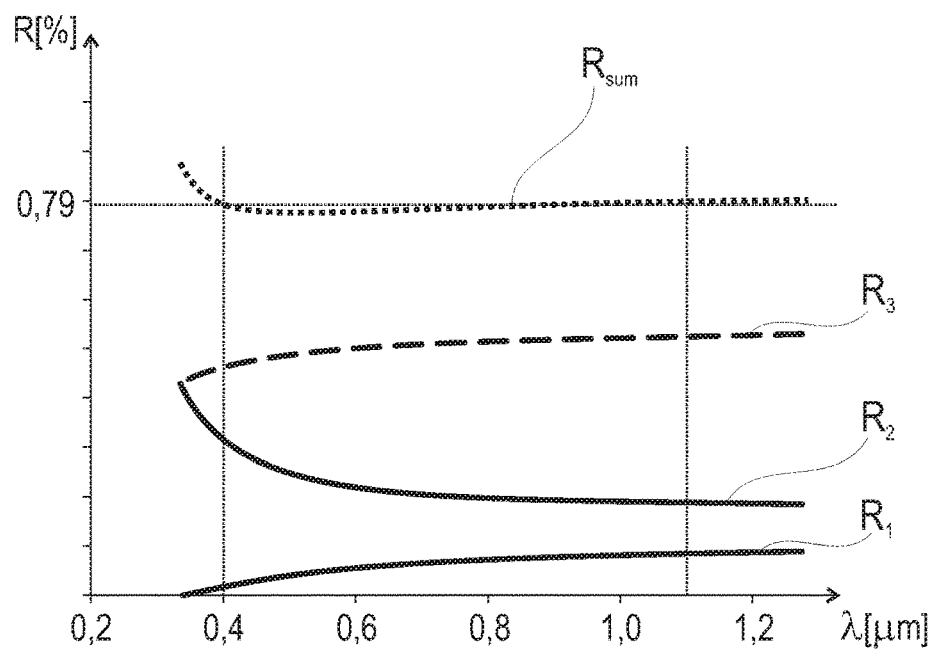
FIG. 5b is a diagram showing the reflected beam percentage $R_1$, $R_2$, $R_3$ at the individual interfaces $A_1$, $A_2$, $A_3$ of a beam splitter of a device, with the refractive indices $n_1(\lambda)$ and $n_2(\lambda)$ according to FIG. 5a and the resulting summarily reflected beam percentage $R_{sum}$ for the beam splitter.

For the example shown in FIG. 5a, for which the beam percentage $R_1, R_2, R_3$ reflected at the individual interfaces $A_1, A_2, A_3$ and the summary beam percentage $R_{sum}$ are given in FIG. 5b, an angle of incidence α smaller than an angle equal to a Brewster angle for a refractive index equal to $n_{1max}$ plus 5° was selected. 1 SF 6 was selected as the material for the first planar plate and 2 N-BAK2 for the second planar plate. The specified spectral range is between 400 nm and 1100 nm. The angle of incidence α selected in this connection is 62.57° and corresponds to the Brewster angle for a refractive index $n_a$ equal to 1.92. The summary beam percentage $R_{sum}$ over the specified spectral range is 0.79% of the optical beam S, with a fluctuation range of 3.2%.

The designations of the materials indicated always refer to a type of optical glass as found in the Schott Glass Catalog of February 2016 (http://www.schott.com/d/advanced_optics/1de0c3b6-522e-4ecd-b297-d1c10099a0c2/1.5/schott-optical-glass-pocket-catalog-february-2016-de.pdf).

For all three exemplary embodiments shown, the fluctuation range of the summary beam percentage $R_{sum}$, which is the sum of the beam percentages $R_1, R_2, R_3$ reflected at the three interfaces $A_1, A_2, A_3$, is smaller than the spectral fluctuation range of the beam percentages $R_1$, $R_2$, $R_3$ reflected at each of the three interfaces $A_1$, $A_2$, $A_3$.

Figure 2:
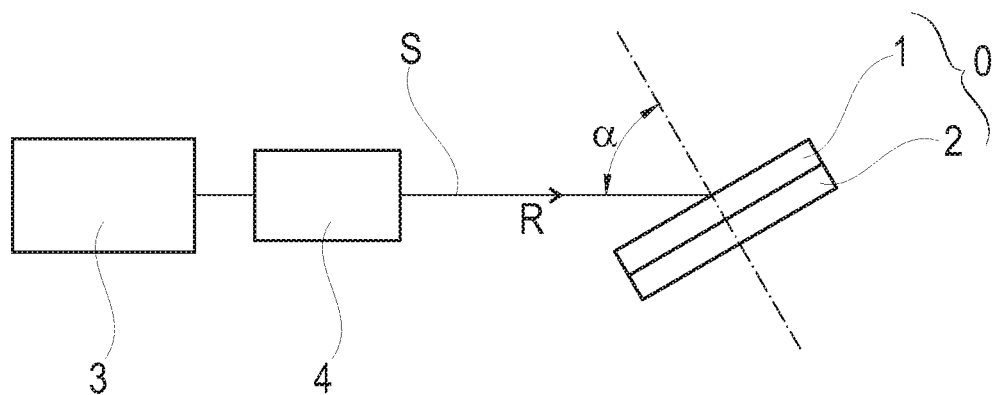
FIG. 2 is a schematic diagram showing a device comprising a beam splitter.

An embodiment of a device according to the invention comprising the beam splitter 0 is shown as a schematic diagram in FIG. 2. In addition to the beam splitter 0, formed by the first and second planar plates 1, 2, the device includes a beam emitting unit 3, which emits a collimated optical beam S, and a polarizer 4 arranged downstream of the emitting unit 3 in a beam direction R and polarizing the optical beam S linearly, parallel to a plane of incidence. The beam emitting unit 3, the polarizer 4 and the beam splitter 0 are arranged relative to each other in such a way that the optical beam S impinges on the first interface $A_1$ or the third interface $A_3$ at an angle of incidence α. The angle of incidence α can be calculated as the Brewster angle for a refractive index $n_a$ greater than the maximum refractive index $n_{2max}$ of the second planar plate 2 and is smaller than the Brewster angle for the maximum refractive index $n_{1max}$ of the first planar plate 1 plus 5° within a specified wavelength range. The device does not include a polarizer 4 if the beam emitting unit 3 emits a collimated and already linearly polarized optical beam S.

LIST OF REFERENCE NUMERALS

0 beam splitter
1 first planar plate
$n_1(\lambda)$ refractive index of the material of the first planar plate
2 second planar plate
$n_2(\lambda)$ refractive index of the material of the second planar plate
3 beam emitting unit
4 polarizer
R beam direction
S optical beam
$S_{R1}$ partial beam of the optical beam S, reflected at the first interface $A_1$
$S_{R2}$ partial beam of the optical beam S, reflected at the second interface $A_2$
$S_{R3}$ partial beam of the optical beam S, reflected at the third interface $A_3$
$S_{R\Sigma}$ summary partial beam of the optical beam S
$R_1$ beam percentage (of the radiation intensity of the optical beam S) reflected at the first interface $A_1$
$R_2$ beam percentage (of the radiation intensity of the optical beam S) reflected at the second interface $A_2$
$R_3$ beam percentage (of the radiation intensity of the optical beam S) reflected at the third interface $A_3$
$R_{sum}$ summary beam percentage (of the radiation intensity of the optical beam S)
a refractive index interval
α angle of incidence
λ wavelength
$n_a$ refractive index for which the angle of incidence α represents a Brewster angle
$A_1$ first interface
$A_2$ second interface
$A_3$ third interface
E plane of incidence

The invention claimed is:

1. A device comprising:
   a beam splitter, and
   a beam emitting unit arranged upstream of the beam splitter, which emits a collimated optical beam, and a polarizer, which polarizes the collimated optical beam linearly parallel to a plane of incidence, or
   a beam emitting unit arranged upstream of the beam splitter, which emits a collimated optical beam polarized linearly parallel to a plane of incidence,
   the collimated optical beam polarized linearly parallel to the plane of incidence in such a way that the collimated optical beam impinges on the beam splitter at an angle of incidence,
   wherein the beam splitter comprises first and second adjoining planar plates of different materials, and for a predetermined wavelength range of the optical beam, a material of the first planar plate has a minimum refractive index which is greater by a refractive index interval than a maximum refractive index of a material of the second planar plate,
   wherein, when the collimated optical beam, polarized linearly parallel to the plane of incidence, is coupled into the beam splitter at the angle of incidence, a summarily reflected partial beam with a summary beam percentage of less than 10% of the optical beam is coupled out with a spectral fluctuation range of less than 300% over the predetermined wavelength range, if the angle of incidence is equal to a Brewster angle for a refractive index greater than the maximum refractive index of the second planar plate, and the angle of incidence is smaller than the Brewster angle for the maximum refractive index of the first planar plate plus 5°.

2. The device comprising the beam splitter according to claim 1, wherein the angle of incidence is between 56° and 68°.

3. A method for coupling out a partial beam from an optical beam with a predetermined wavelength range using the device according to claim 1, wherein:
   the optical beam is collimated and is directed, polarized linearly parallel to a plane of incidence, onto the beam splitter at an angle of incidence, the angle of incidence corresponding to a Brewster angle for a refractive index which is greater than a maximum refractive index of the second planar plate), within the predetermined wavelength range, and smaller than the Brewster angle for the maximum refractive index of the first planar plate, within the specified wavelength range plus 5°.

4. The method according to claim 3, wherein:
   the angle of incidence is selected such that it corresponds to a Brewster angle for a refractive index at which the reflectivity percentage of the second interface of the beam splitter in the summary reflectivity has a maximum at a lower end of the predetermined wavelength range.

* * * * *